United States Patent
Shen et al.

(10) Patent No.: US 10,122,054 B2
(45) Date of Patent: Nov. 6, 2018

(54) BATTERY PACK SYSTEMS THAT INCLUDE POLYMERS

(71) Applicant: GM GLOBAL TECHNOLOGY OPERATIONS LLC, Detroit, MI (US)

(72) Inventors: Jingmei Shen, Sterling Heights, MI (US); Mei Cai, Bloomfield Hills, MI (US); Zhongying Shi, Sunnyvale, CA (US); Tao Wang, Oakland Township, MI (US); Wayne Z. Ptasinski, Sterling Heights, MI (US); Simon T. Dunmore, West Bloomfield, MI (US); William J. Wallace, Beverly Hills, MI (US); Helen X. Qin, Sterling Heights, MI (US); Li Yang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 15/073,301

(22) Filed: Mar. 17, 2016

(65) Prior Publication Data

US 2017/0271726 A1    Sep. 21, 2017

(51) Int. Cl.
*H01M 10/65* (2014.01)
*H01M 10/637* (2014.01)
(Continued)

(52) U.S. Cl.
CPC ....... *H01M 10/637* (2015.04); *H01M 2/1083* (2013.01); *H01M 2/1094* (2013.01);
(Continued)

(58) Field of Classification Search
CPC .. H01M 10/50; H01M 10/613; H01M 2/1094; H01M 2/1083; H01M 10/658;
(Continued)

(56) References Cited

U.S. PATENT DOCUMENTS 8,936,864 B2    1/2015  Yang et al.
2010/0273041 A1  10/2010  Lawall et al.
(Continued)

FOREIGN PATENT DOCUMENTS

CN    107204497 A    9/2017
DE    102017105444 A1    9/2017

OTHER PUBLICATIONS

Ward, et al.; "Thermoresponsive Polymers for Biomedical Applications"; Polymers; 2011; Issn 2073-4360; vol. 3; pp. 1215-1242.
(Continued)

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

Examples of battery pack systems that include polymers are a cooling system, a thermal management system, and a liquid leakage control system. The cooling system and the thermal management systems may include an upper critical solution temperature polymer or a lower critical solution temperature polymer. The liquid leakage control system includes a superabsorbent polymer.

19 Claims, 7 Drawing Sheets

(51) Int. Cl.

| | | |
|---|---|---|
| *H01M 10/613* | (2014.01) | |
| *H01M 10/625* | (2014.01) | |
| *H01M 10/647* | (2014.01) | |
| *H01M 10/653* | (2014.01) | |
| *H01M 10/6556* | (2014.01) | |
| *H01M 10/6568* | (2014.01) | |
| *H01M 10/658* | (2014.01) | |
| *H01M 2/10* | (2006.01) | |

(52) U.S. Cl.
CPC ....... *H01M 10/613* (2015.04); *H01M 10/625* (2015.04); *H01M 10/647* (2015.04); *H01M 10/653* (2015.04); *H01M 10/658* (2015.04); *H01M 10/6556* (2015.04); *H01M 10/6568* (2015.04); *H01M 2220/20* (2013.01)

(58) Field of Classification Search
CPC ......... H01M 10/6568; H01M 10/6556; H01M 10/653
See application file for complete search history.

(56) References Cited

U.S. PATENT DOCUMENTS

2012/0258313 A1* 10/2012 Wen ..................... C09D 131/00
  428/412
2012/0258337 A1* 10/2012 Wang ................ H01M 10/0525
  429/50

OTHER PUBLICATIONS

Kohno, et al.; "Thermoresponsive polyelectrolytes derived from ionic liquids"; Polymer Chemistry; 2015; vol. 6; pp. 2163-2178.

Seuring, Jan; Polymers with Upper Critical Solution Temperature in Aqueous Solution; Dissertation; 2012; pp. 1-138.

Shen, et al.; "Upper-critical solution temperature (UCST) polymer functionalized graphene oxide as thermally responsive ion permeable membrane for energy storage devices"; J. Mater. Chem. A; 2014 vol. 2; 18204-18207.

* cited by examiner

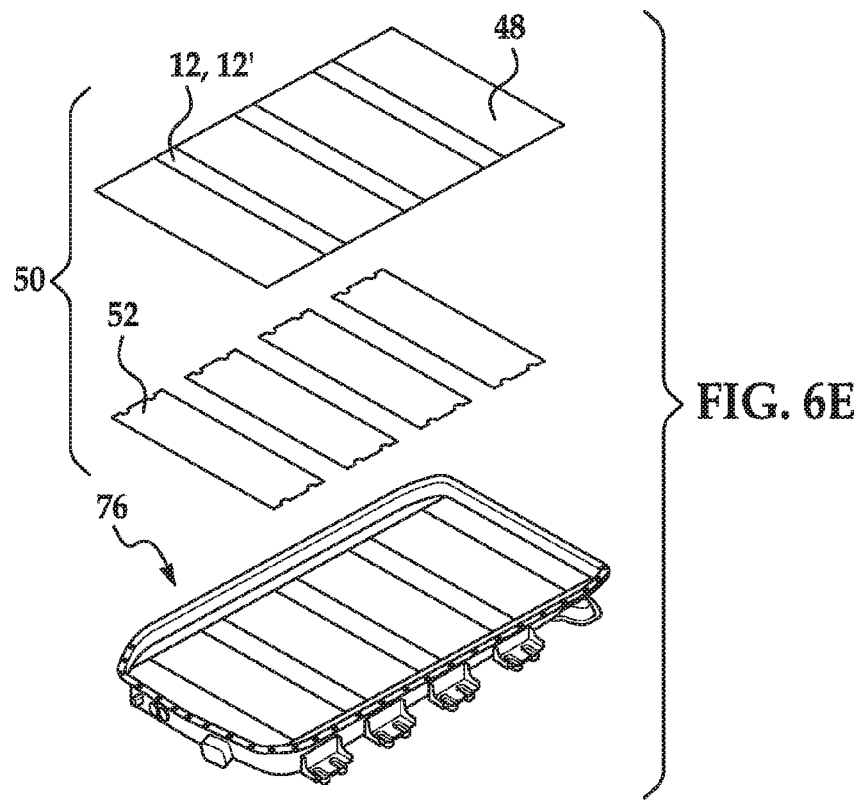
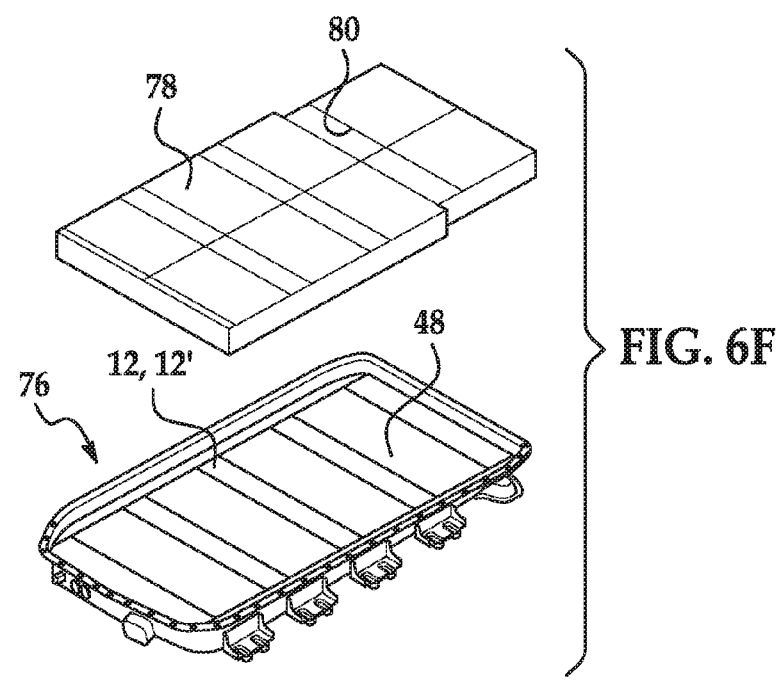

BATTERY PACK SYSTEMS THAT INCLUDE POLYMERS

TECHNICAL FIELD

The present disclosure relates generally to battery pack systems that include polymers

BACKGROUND

Lithium-ion based batteries exhibit high performance, but this performance can be deleteriously affected by the temperature of the battery. Low temperatures (e.g., −10° C. or less) can reduce battery energy (discharge capacity) and power (operating voltage). High temperatures (greater than 45° C.) can substantially degrade the battery life.

SUMMARY

Examples of battery pack systems that include polymers are a cooling system, a thermal management system, and a liquid leakage control system. The cooling system and the thermal management systems disclosed herein include an upper critical solution temperature (UCST) polymer or a lower critical solution temperature (LCST) polymer. The liquid leakage control system disclosed herein includes a superabsorbent polymer.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 6A through 6F together depict a battery pack assembly process; and

DETAILED DESCRIPTION

The example systems disclosed herein utilize various types of polymers in order to improve heating and cooling or to improve leakage control within a lithium-ion battery pack. Some example systems utilize smart polymers, specifically an upper critical solution temperature (UCST) polymer or a lower critical solution temperature (LCST) polymer, which exhibit a phase separation from an aqueous or non-aqueous solution either below a certain temperature or above a certain temperature. Some smart polymers have both a UCST and a LCST. Other example systems utilize superabsorbent polymers (i.e., slush powder), which can absorb and retain extremely large amount of a liquid relative to their own mass.

The example systems include a cooling system, a thermal management system, and a leak control system. In addition to being suitable for use in the lithium-ion battery pack, the various systems may be used in other applications. For example, the example systems may be used in any electronic system that is capable of generating heat during operation.

Figure 1:
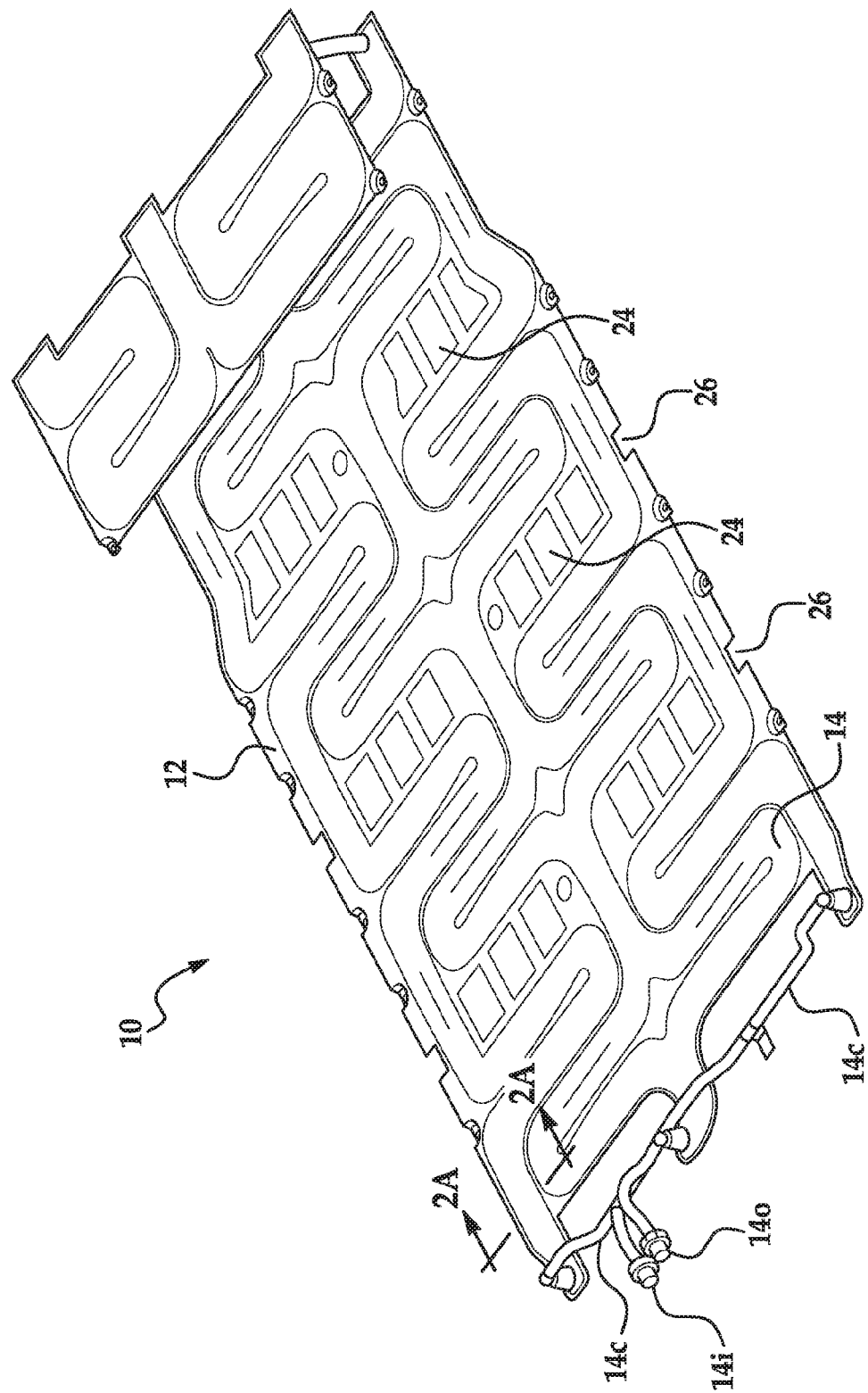
FIG. 1 is a perspective view of an example of a cooling system.
Figure 2A:
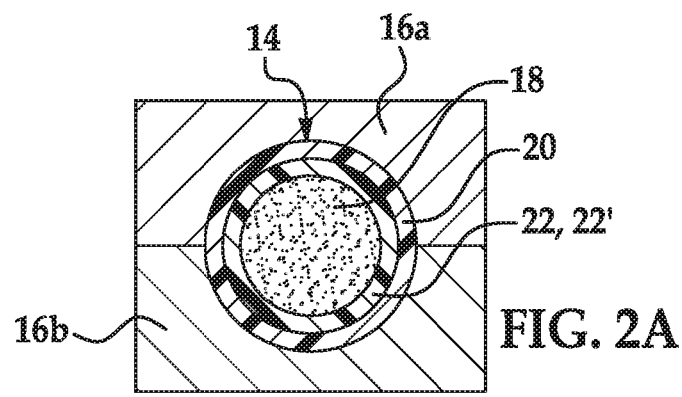
FIG. 2A is a cross-sectional view, taken along lines 2-2 of FIG. 1, of a portion of the cooling system including a fluid coolant channel, where the fluid coolant channel includes an upper critical solution temperature (UCST) polymer or a lower critical solution temperature (LCST) polymer as an inner polymer layer, and where the UCST polymer or the LCST polymer and a solvent in the fluid coolant channel are in separate phases.
Figure 2B:
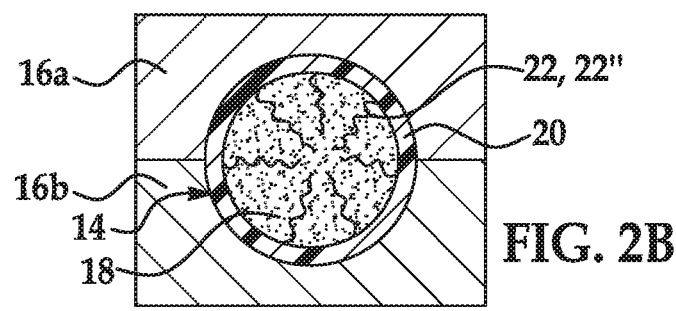
FIG. 2B is a similar view to FIG. 2A, except that the UCST polymer and the solvent or the LCST polymer and the solvent are shown in a single phase.

One example system disclosed herein is the cooling system 10, as shown in FIG. 1. The cooling system 10 includes a cooling plate 12 and coolant fluid channel(s) 14 defined in the cooling plate 12. In an example, the cooling plate 12 may be a single sheet of a thermally conductive material (e.g., metal) that has the coolant fluid channel(s) 14 molded or otherwise formed therein, or may be two sheets of a thermally conductive material (e.g., metal) that together define the coolant fluid channel(s) 14. In still another example, the cooling plate 12 may be formed of a top sheet of a thermally conductive material (which faces a cell or module in a battery pack) and a bottom sheet of a thermally conductive material or a non-thermally conductive material (which faces a tray in a battery pack). As examples, the bottom sheet may be metal or plastic. Examples of the bottom sheet include aluminum, steel, manganese, copper, organic polymers, etc. As shown in FIGS. 2A and 2B, the cooling fluid channel(s) 14 may be defined between two metal sheets 16a, 16b. The metal sheets 16a, 16b may be formed of aluminum, steel, copper, manganese, etc., and may be adhered together via welding, an adhesive, or another suitable fastening process or mechanism. The thickness of the thermally conductive material top sheet may range from about 0.2 mm to about 3.0 mm. The entire cooling plate 12, including the space/height of coolant fluid channel(s) 14, may have a thickness ranging from about 0.5 mm to about 40 mm.

The coolant fluid channel(s) 14 are configured to carry a fluid 18 (FIGS. 2A and 2B) therein. In the examples of the cooling system 10 disclosed herein, the fluid 18 is the aqueous solution/solvent that can form a single phase with the UCST polymer or the LCST polymer and that can also be a separate phase from the UCST polymer or the LCST polymer. The fluid 18 may be pumped throughout the coolant fluid channel(s) in order to cool the cell(s) of the battery pack in which the cooling system 10 is included. An example of the fluid 18 is water. Another example of the fluid is a mixture of water and an anti-freeze or coolant (e.g., DEX-COOL® available from Prestone). As one example, the fluid 18 may be a 1:1 mixture of water and DEX-COOL®.

As shown in FIGS. 2A and 2B, the coolant fluid channel(s) 14 includes an outer polymer layer 20. Examples of the outer polymer layer 20 include polyethylene, polystyrene, etc.

As shown in FIGS. 2A and 2B, the coolant fluid channel(s) 14 also includes an inner polymer 22, which has the UCST or the LCST.

The UCST is a critical temperature point below which the inner polymer 22 and the fluid 18 are phase separated (FIG. 2A) and above which the inner polymer 22 and the fluid 18 are completely miscible (FIG. 2B). When the inner polymer 22 is a UCST polymer and the temperature of the cooling system 10 is below the UCST, the inner polymer 22 and the fluid 18 are, respectively, an inner polymer coating 22' of the coolant fluid channel(s) 14 and a liquid fluid 18 contained within the coolant fluid channel(s) 14 (FIG. 2A). However, when the temperature of the cooling system 10 is above the UCST, the inner polymer 22 chains uncoil (shown as 22" in FIG. 2B) and become miscible with the fluid 18. At the higher temperatures, the UCST polymer and the fluid 18 form a single gel phase.

Examples of the UCST polymer include poly(sulfobetaine), poly(ethylene oxide), poly(vinyl methyl ether), hydrophobically modified poly(vinyl alcohol), poly(hydroxyethylmethacrylate), poly(acrylic acid), poly(uracilacrylate), poly((meth)acrylamide-co-N-acetylacrylamide), poly(N-acryloylasparagineamide, poly(N-acryloylglutamineamide, and poly(N-methacryloylasparagineamide). When selecting the UCST polymer, the heat absorption capability of the polymer may be considered. Heat absorption capability relates to the polymer structure and molecular weight, and thus these polymer characteristics may be considered when selecting the UCST polymer.

The inclusion of the inner polymer 22 having the UCST has several advantages. When the polymer 22, 22" and fluid 18 are in the gel phase, there is no free liquid in the coolant fluid channel(s) 14, and this can reduce the risk of fluid leakage. Additionally, the inner polymer 22 remains in the coolant fluid channel(s) 14.

Rather than being used as the inner polymer 22 in the cooling system 10, the UCST polymer may be used in a sensor of the cooling system 10. This sensor may be positioned at a coolant fluid inlet 14i and a coolant fluid outlet 14o to function as gates to control fluid 18 flow based on temperature.

The LCST is a critical temperature point above which the inner polymer 22 and the fluid 18 are phase separated (FIG. 2A) and below which the inner polymer 22 and the fluid 18 are completely miscible (FIG. 2B). When the inner polymer 22 is a LCST polymer and the temperature of the cooling system 10 is above the LCST, the inner polymer 22 and the fluid 18 are, respectively, an inner polymer coating 22' of the coolant fluid channel(s) 14 and a liquid fluid 18 contained within the coolant fluid channel(s) 14 (FIG. 2A). However, when the temperature of the cooling system 10 is below the LCST, the inner polymer 22 chains uncoil (shown as 22' in FIG. 2B) and become miscible with the fluid 18. At the lower temperatures, the LCST polymer and the fluid 18 form a single gel phase.

Examples of the LCST polymer include poly(N-isopropylacrylamide), poly(N,N-diethylacrylamide), poly(N-vinlycaprolactam), poly[2-(dimethylamino)ethyl methacrylate], poly(ethylene glycol), and poly(ethylene oxide). When selecting the LCST polymer, the heat absorption capability of the polymer may be considered. Heat absorption capability relates to the polymer structure and molecular weight, and thus these polymer characteristics may be considered when selecting the LCST polymer.

In one example of the cooling system 10 used in the battery pack, the inner polymer 22 is the LCST polymer having 30° C. as the LCST. In this example, circulation is not on at temperatures below 30° C. because the LCST polymer and the fluid 18 form the single gel phase, and circulation is on at temperatures above 33° C. because the LCST polymer is a solid layer 22' and the fluid 18 circulates through the coolant fluid channel(s) 14.

The inclusion of the inner polymer 22 having the LCST has several advantages. When the polymer 22 and fluid 18 are in the gel phase, there is no free liquid in the coolant fluid channel(s) 14, and this can reduce the risk of fluid leakage. Additionally, the inner polymer 22 remains in the coolant fluid channel(s) 14. Still further, active liquid cooling is automatically turned on or off in accordance with the temperature of the system 10. This reduces the amount of water used and also reduces the number of times that active cooling is turned on. This may also reduce the amount of time it takes to cool the system (e.g., 30 minutes compared to 1 to 2 hours with traditional liquid cooling systems).

To form the inner polymer 22, the UCST or the LCST polymer may be coated on the interior surface of the outer polymer layer suitable any suitable technique. Examples of suitable techniques include in-situ polymerization, spray coating, other coating techniques, etc.

The coolant fluid channel(s) 14 may include coolant connection tubes 14c, which connect several stacked coolant plates 12 together and also connect a coolant fluid inlet 14i and a coolant fluid outlet 14o for circulating the fluid 18 throughout the coolant fluid channel(s) 14.

The cooling system 10 shown in FIG. 1 illustrates one example of the configuration of the cooling plate 12. The cooling plate 12 may have openings 24 and/or notches 26 formed therein. The openings 24 and/or notches 26 can receive a linking mechanism to connect the cooling plate 12 to other components, for example, of a battery pack.

Figure 3:
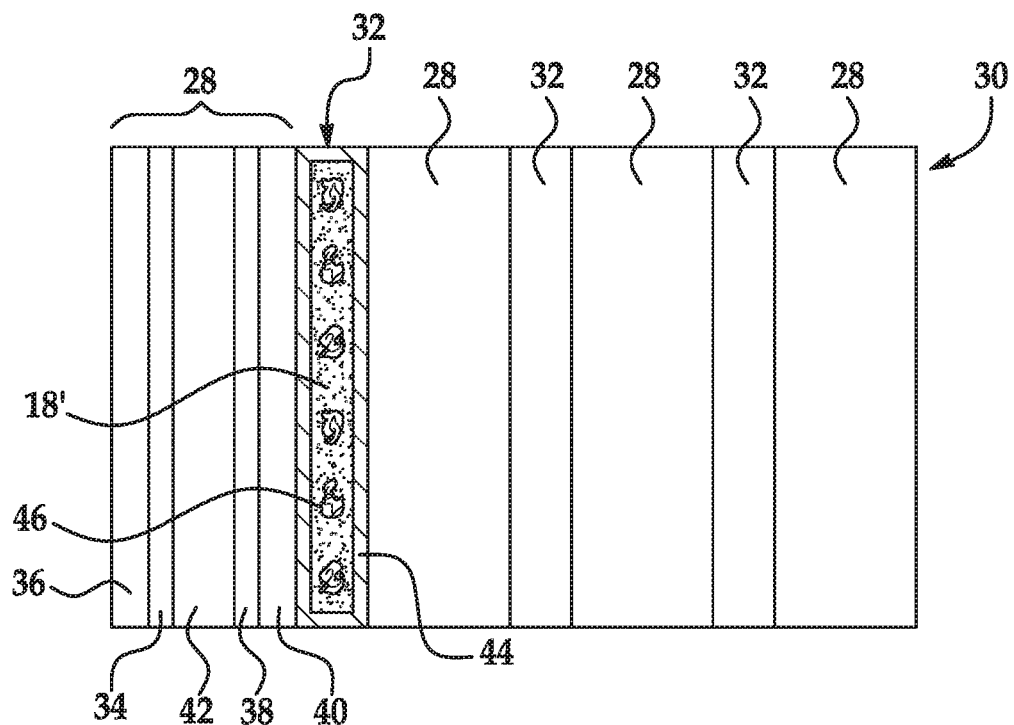
FIG. 3 is a schematic and partially cross sectional view of an example of a thermal management system.

Another example system disclosed herein is the thermal management system 30, as shown in FIG. 3. The thermal management system 30 includes a plurality of battery cells 28 and a thermal isolation mechanism 32 positioned between adjacent battery cells 28. The thermal isolation mechanism 32 may replace other isolation pads that could be positioned between the battery cells 28, or may be used in conjunction with other isolation pads that could be positioned between the battery cells 28.

Any type of battery cell 28 may be used. As one example, each battery cell 28 includes a negative electrode 34 and its associated current collector 36 (e.g., formed of Cu), a positive electrode 38 and its associated current collector 40 (e.g., formed of Al), and a separator 42 electrically isolating and ionically connecting the negative and positive electrodes 38. The materials used in each of the components of the battery cell 28 may depend on the type of battery cell 28. As examples for a lithium-based cell, a lithium or sulfur based positive electrode 38 may be paired with a lithium or lithium titanate negative electrode 34, a silicon/silicon alloy/silicon oxide or silicon suboxide negative electrode 34, a graphite negative electrode 34, a tin/tin alloy negative electrode 34, an antimony/antimony alloy negative electrode 34, or other suitable negative electrode 34. Each battery cell 28 is also soaked in a suitable electrolyte, which will depend, in part, on the materials for the negative and positive electrodes.

The battery cells 28 may be connected in series or parallel. Together, the battery cells may form a battery module. A single module may include from 1 to 10 cells 28, or from 1 to 20 cells 28. In some examples, the number of cells 28 may be further increased.

Each thermal isolation mechanism 32 includes a thermally conductive material housing 44, a fluid 18' contained within the housing 44, and a polymer 46, which has the UCST or the LCST.

The thermally conductive material housing 44 may be any suitable thermally conductive materials, such as carbon nanotubes, copper, graphite, gold, nickel, silver, titanium, etc. The total thickness of the thermally conductive material housing 44, including the portion where the polymer 46 resides, may range from about 0.5 mm to about 40.0 mm.

In the examples of the thermal isolation mechanism 32 disclosed herein, the fluid 18' is the aqueous solution/solvent or a non-aqueous solution/solvent that can form a single phase with the polymer 46 and that can also be a separate phase from the polymer 46. An example of the fluid 18' is water or an organic solvent.

Similar to the inner polymer 22, the UCST is the critical temperature point below which the polymer 46 and the fluid 18' are phase separated, and above which the polymer 46 and the fluid 18' are completely miscible. When the polymer 46 is a UCST polymer and the temperature of the thermal isolation mechanism 32 is below the UCST, the polymer 46 and the fluid 18' are, respectively, tightly coiled polymer chains (as shown in FIG. 3) and a liquid fluid 18' contained within the thermally conductive material housing 44. However, when the temperature of the thermal isolation mechanism 32 is above the UCST, the polymer 46 chains uncoil (not shown) and become miscible with the fluid 18'. At the higher temperatures, the UCST polymer and the fluid 18 form a single gel phase.

Any of the examples of the UCST polymer previously described may be used in the thermal isolation mechanism 32.

Also, similar to the inner polymer 22, the LCST is a critical temperature point above which the polymer 46 and the fluid 18' are phase separated, and below which the polymer 46 and the fluid 18' are completely miscible. When the polymer 46 is a LCST polymer and the temperature of the thermal isolation mechanism 32 is above the LCST, the polymer 46 and the fluid 18' are, respectively, tightly coiled polymer chains (as shown in FIG. 3) and a liquid fluid 18' contained within the thermally conductive material housing 44. However, when the temperature of the thermal isolation mechanism 32 is below the LCST, the polymer 46 chains uncoil and become miscible with the fluid 18'. At the lower temperatures, the LCST polymer and the fluid 18' form a single gel phase.

Any of the examples of the LCST polymer previously described may be used in the thermal isolation mechanism 32.

The inclusion of the polymer 46 having either the UCST or the LCST in the thermal isolation mechanism 32 has several advantages. The polymer 46 in the thermal isolation mechanism 32 helps to manage thermal runaway between the battery cells 28. The heat generated by any given cell 28 may be transferred from the cell 28 through the thermally conductive material housing 44 to the polymer 46 and the liquid 18'. The polymer 46 with the UCST absorbs the heat and upon reaching the UCST, undergoes a phase transition that results in a single phase gel. Through latent heat absorption, the UCST polymer 46 prevents the heat from reaching an adjacent cell 28, and thus prevents thermal runaway from one cell 28 to other cells 28. The polymer 46 with the LCST minimizes liquid movement when below the LCST. When the temperature increases to above its critical temperature point, the LCST polymer 46 and the fluid 18' become phase separated, and the reduced viscosity does not interfere with liquid circulation, which favors moving the heat out of the cells 28 efficiently. Additionally, during the phase transition of either of the polymers 46, the volume of the thermal isolation mechanism 32 does not change. The volume stays the same as the fluid's volume 18. Still further, when the polymer 46 and fluid 18' are in the gel phase, there is no free liquid in the thermal isolation mechanism 32, and this can reduce the risk of fluid leakage.

The previous advantages may make the thermal isolation mechanism 32 disclosed herein more desirable than, for example, a system including a typical phase change material (PCM), which may have a limited heat of capacity and large/high volume and pressure changes.

Figure 4:
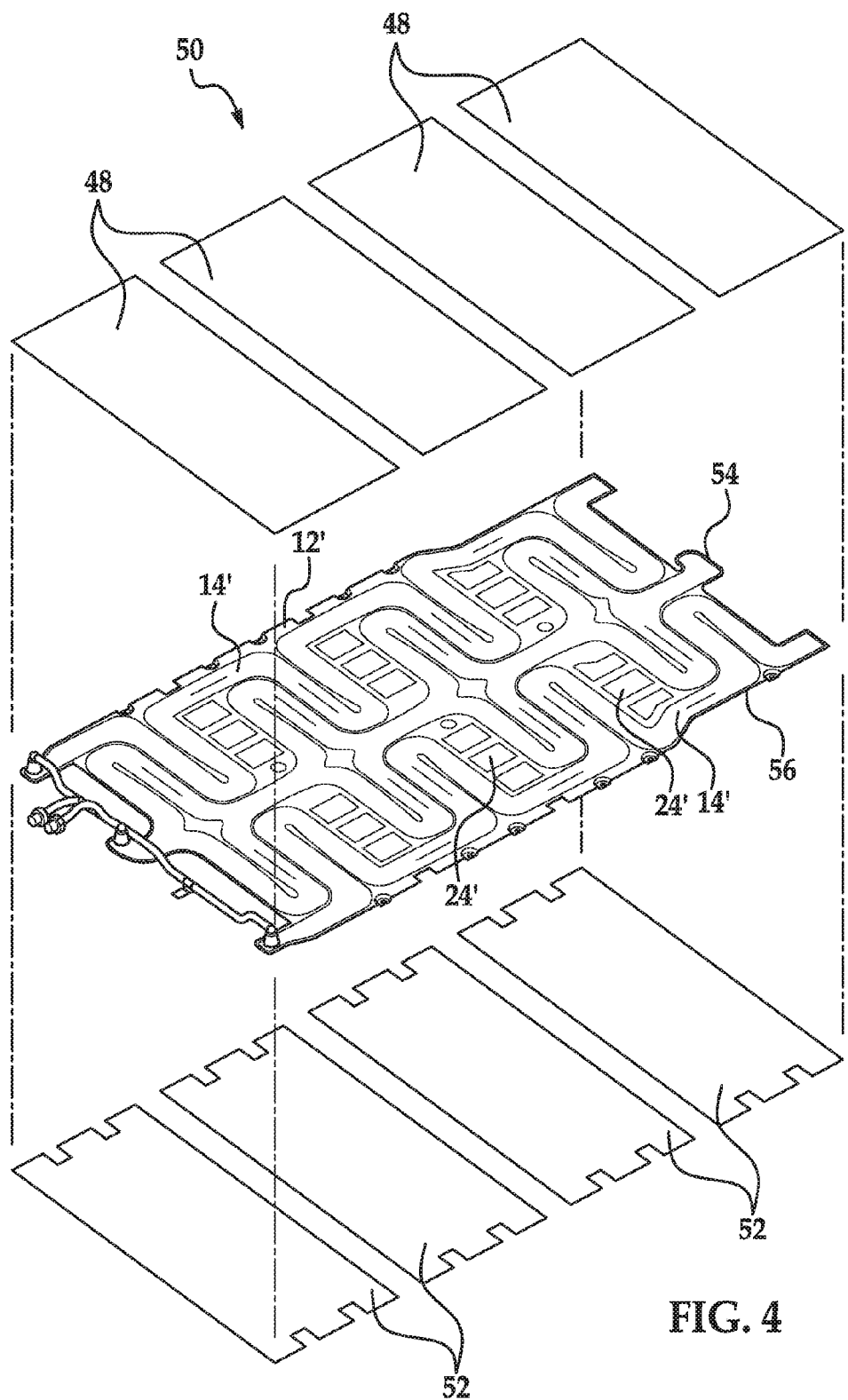
FIG. 4 is an exploded, perspective view of an example of a liquid leakage system.

Referring now to FIG. 4, an exploded view of the liquid leakage control system 50 is depicted. The liquid leakage control system 50 includes a cooling plate 12' having coolant fluid channels 14' defined therein. The cooling plate 12' and coolant fluid channels 14' may be configured similar to or different from the cooling plate 12 and the coolant fluid channels 14 previously described. The liquid leakage control system 50 also includes interface pad(s) 48 in contact with one surface 54 of the cooling plate 12' and isolation pad(s) 52 in contact with an opposed surface 56 of the cooling plate 12'. The interface pad(s) 48 and isolation pad(s) 52 may be positioned adjacent to the coolant fluid channels 14' so that openings 24' of the cooling plate 12' remain unobstructed.

In the examples of the liquid leakage control system 50 disclosed herein, each of the interface pad(s) 48 and the isolation pad(s) 52 are formed of a superabsorbent polymer (SAP, also referred to as slush powder). Examples of the superabsorbent polymer include sodium polyacrylate, polyacrylamide copolymer, ethylene maleic anhydride copolymer, cross-linked carboxymethylcellulose, polyvinyl alcohol copolymers, cross-linked polyethylene oxide, and a starch grafted copolymer of polyacrylonitrile. It is to be understood that the superabsorbent polymer forming the interface pad(s) 48 may be the same as or different from the superabsorbent polymer forming the isolation pad(s) 52.

The superabsorbent polymer is capable of absorbing and retaining large amounts of a liquid (e.g., fluid 18 circulating through the coolant fluid channels 14') relative to its own mass. As such, if fluid 18 were to leak out of the coolant fluid channel 14', the interface pad(s) 48 and/or isolation pad(s) 52 may absorb the fluid 18 and thus may prevent the fluid 18 from reaching leaking out of the system 50. This may protect battery cells 28 and/or electronic circuitry of a battery pack in which the system 50 is incorporated.

The interface pad(s) 48 and/or isolation pad(s) 52 may be formed by sealing a suitable amount of the SAP into a suitable container. The container may be a plastic bag (e.g., polystyrene, polyethylene, etc.) with holes or another breathable material that allows water to enter and be absorbed by the SAP.

Figure 5:
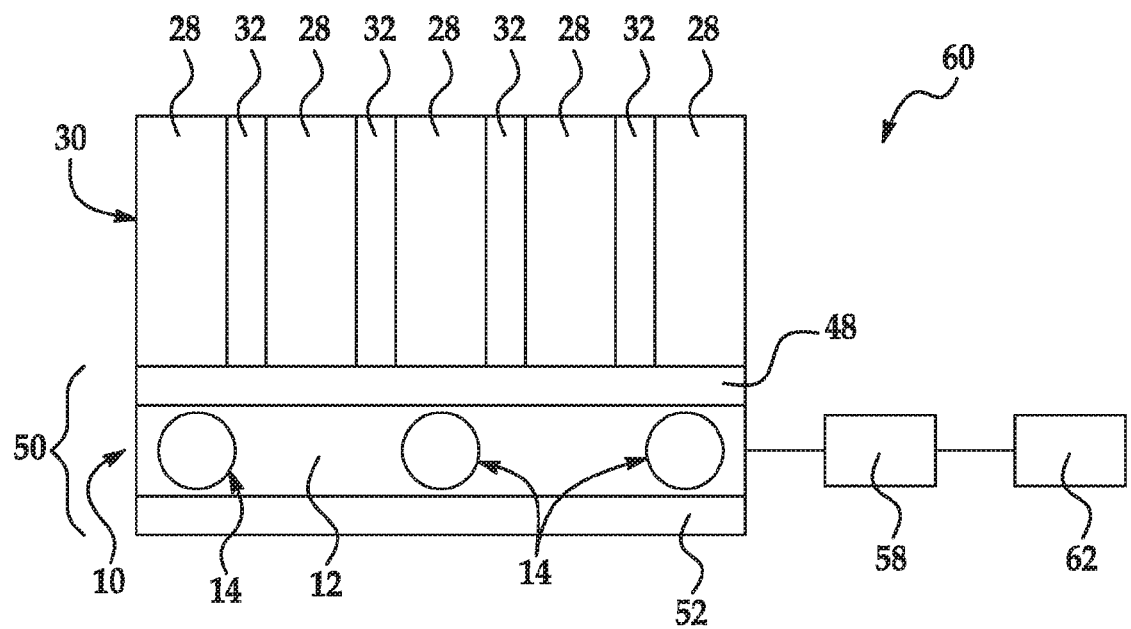
FIG. 5 is a schematic view of an example of a battery pack.

Referring now to FIG. 5, a schematic illustration of a battery pack 60 including each of the systems 10, 30 and 50 disclosed herein. Specifically, the battery pack 60 includes the cooling system 10 of FIG. 1, the thermal management system 30 of FIG. 3, and the liquid leakage control system 50 of FIG. 4. Any of the materials previously described for the various systems 10, 30, 50 may be used when the systems 10, 30, 50 are incorporated into the single battery pack 60.

The battery pack 60 includes the cooling plate 12 (as described in reference to FIG. 1), and the cooling plate 12 is considered to be part of both the cooling system 10 and the liquid leakage control system 50 of the battery pack 60. While not shown in FIG. 5, it is to be understood that the coolant fluid channel(s) 14 include the outer polymer layer 20 and the inner polymer 22, which has the UCST or the LCST, as previously described in reference to FIG. 1. The coolant fluid channel(s) 14 are also configured to contain and carry the fluid 18. Also while not shown in FIG. 5, it is to be understood that each of the thermal isolation mechanisms 32 includes the thermally conductive material housing 44, the fluid 18' contained within the housing 44, and the polymer 46, which has the UCST or the LCST, as previously described in reference to FIG. 3.

As depicted, the interface pad(s) 48 is/are positioned between the cooling plate 12 and both the cells 28 and the thermal isolation mechanisms 32 of the thermal management system 50.

In the battery pack 60, the inner polymer 22 in the cooling system 10 and the polymer 46 in the thermal isolation mechanism 32 may be the same type of UCST or LCST polymer or may be different types of UCST or LCST polymers.

The battery pack 60 may also include a pump 58 and a liquid reservoir 62 that are operatively connected to the cooling plate 12, and that are respectively used to pump fluid 18 through the cooling plate 12 and to store additional liquid 18.

As mentioned above, the cells 28 in the thermal management system 30 may form a single battery module, and the battery pack 60 may include several battery modules (and thus several thermal management systems 30) that are connected together in series or parallel. In an example, one battery pack 60 may include from 1 to 10, or more battery modules coupled together.

The battery pack 60 may also include a tray to accommodate the insulation pad and support the remainder of the battery pack components. The tray will be described further in reference to FIG. 6A.

FIGS. 6A through 6F together depict a battery pack assembly process.

Figure 6A:
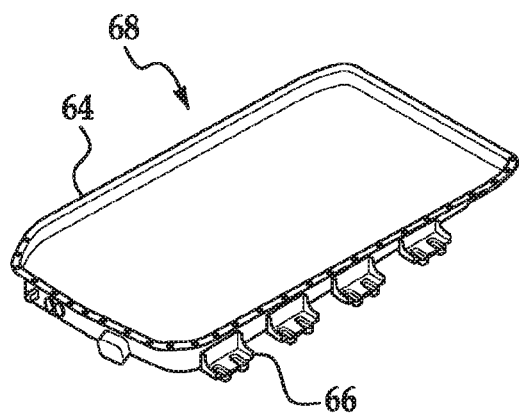

FIG. 6A illustrates a tray 64 and a side bracket 66 that are coupled together to form a tray assembly 68. In an example, the tray 64 and the side bracket 66 may be welded together so that the side bracket 66 is positioned on an exterior side of the tray 64. In another example, the side bracket 66 may be coupled to an internal bracket (e.g., a saddle bracket, not shown) that is oriented on the interior of the tray 64. The tray may be formed of a material that is impermeable to liquid.

The tray 64 may be configured such that it accommodates enough active battery material (such as lithium) via at least one battery cell 28 or module so as to provide a vehicle with a range of about two-hundred miles (or at least two-hundred miles) using the battery pack 60 as a power source. For example, this battery could have a capacity of 60 kwh of energy.

Figure 6B:
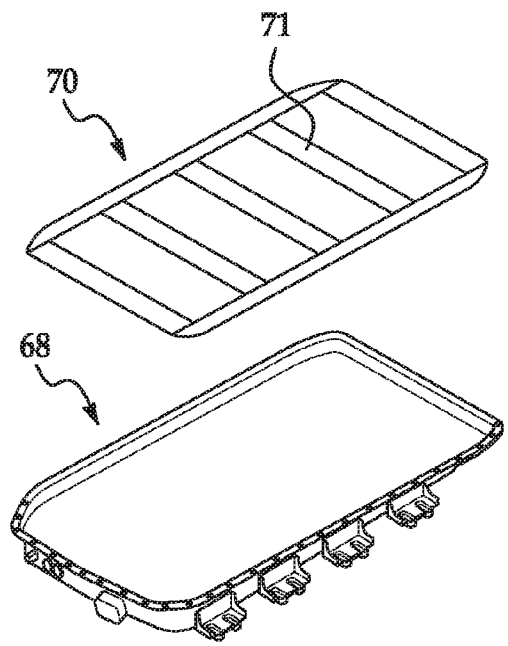
Figure 6C:
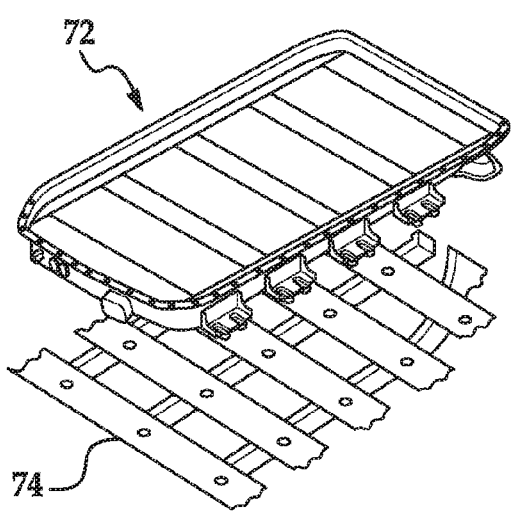
Figure 6D:
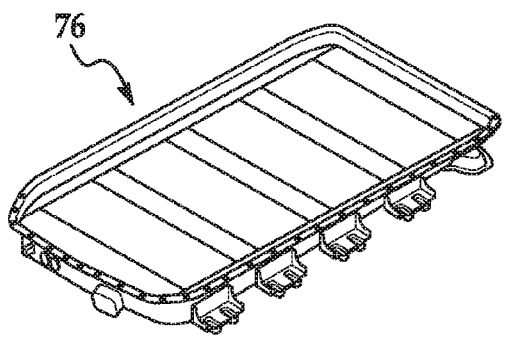

FIG. 6B illustrates the coupling of the tray assembly 68 with an internal bracket assembly 70 to form a tray internal assembly 72 (shown in FIG. 6C). The internal bracket assembly 70 may include internal cross beams 71, internal perimeter beams (not shown), and the previously mentioned internal bracket. The internal cross and perimeter beams may provide additional structural support to the tray 64.

As depicted in FIG. 6C, the tray internal assembly 72 can be coupled (e.g., welded) with an external assembly 74 to form a carrier assembly 76 (shown in FIG. 6D) for the battery pack 60.

FIG. 6E illustrates the coupling of the carrier assembly 76 to the liquid leakage control system 50, which in this example includes the isolation pad(s) 52, the cooling plate 12, 12' (which may be part of the cooling system 10), and the interface pad(s) 48.

FIG. 6F illustrates the coupling of cell modules 78 (each of which includes individual battery cells 28 separated by thermal isolation mechanisms 32) with the interface pad(s) 48. Spaces 80 between cell modules 78 may accommodate additional cross beams (not shown).

While not shown, it is to be understood that the battery pack 60 may include additional components, such as brackets, a rear upper cell module support structure, a rear isolation pad, a rear cooling plate, a rear interface pad, and rear upper cell modules. The battery pack 60 may also include an electronic support structure, electronics and wiring, and an external cover.

Figure 7:
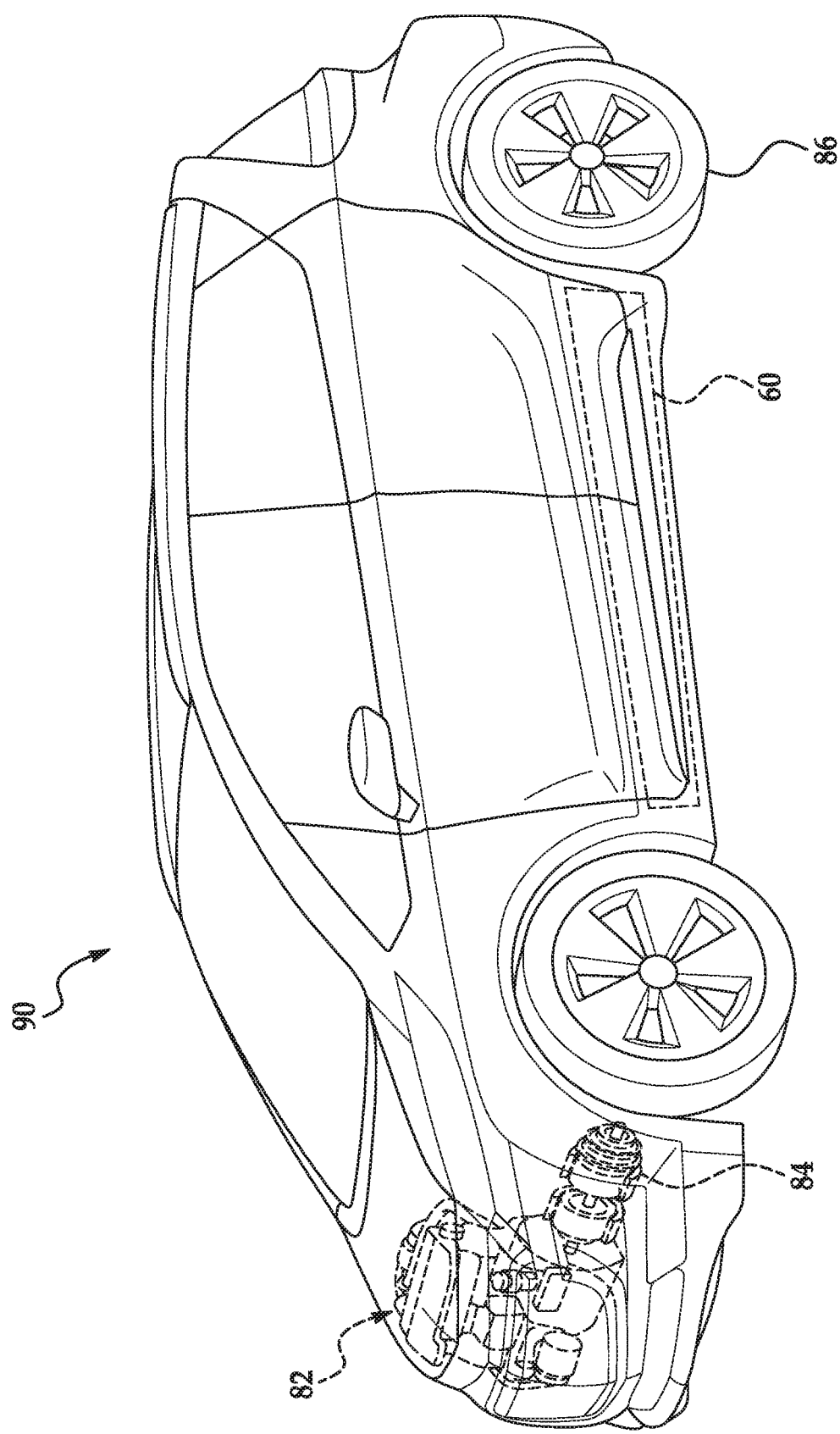
FIG. 7 is a semi-schematic, perspective view of a vehicle including an example of the battery pack disclosed herein.

The battery pack 60 and other systems 10, 30, 50 disclosed herein may be used in an electric/battery powered vehicle or a hybrid vehicle, which in addition to the battery pack 60 includes another power source (e.g., an internal combustion engine 82, which may be connected to an electric motor 84). An example of the vehicle 90 is shown in FIG. 7. The vehicle 90 may be a car, truck, van sport utility vehicle (SUV) or the like.

The vehicle 90 can further include a powertrain (not shown, which could be in the form of a driveshaft or the like) to deliver propulsive power from the internal combustion engine 82, motor/generator 84, and/or battery pack 60 to one or more of the wheels 86.

The battery pack 60 may additionally include a state of charge (SOC) system and power inverter assembly (neither of which are shown), the latter of which includes various modules and capacitors (not shown) as well as other conductive elements configured to provide a pathway for current flow between these and other associated battery-related electronic components. Busbar assemblies can provide compact, reliable electrical connection between the various cells within the battery pack 60.

It is to be understood that the ranges provided herein include the stated range and any value or sub-range within the stated range. For example, a range from 1 to 10 cells should be interpreted to include not only the explicitly recited limits of from 1 to 10 cells, but also to include individual values, such as within about 2 cells, 7 cells, etc., and sub-ranges, such as from 4 cells to 8 cells, from 1 cell to about 9 cells, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:
1. A cooling system, comprising:
a cooling plate;
a coolant fluid channel defined in the cooling plate; and
a solvent carried in the coolant fluid channel;
wherein the coolant fluid channel includes:
an outer polymer layer; and
an inner polymer having an upper critical solution temperature (UCST) or a lower critical solution temperature (LCST), and wherein:
the inner polymer having the UCST and the solvent are configured to form a single gel phase at a temperature above the UCST and the inner poly- mer having the UCST and the solvent are configured to form separate phases at a temperature below the UCST; or the inner polymer having the LCST and the solvent are configured to form a single gel phase at a temperature below the LCST and the inner polymer having the LCST and the solvent are configured to form separate phases at a temperature above the LCST.

2. The cooling system as defined in claim 1 wherein the solvent is selected from the group consisting of water or a combination of water and a coolant.

3. The cooling system as defined in claim 1 wherein the inner polymer has the UCST and is selected from the group consisting of poly(sulfobetaine), poly(ethylene oxide), poly(vinyl methyl ether), hydrophobically modified poly(vinyl alcohol), poly(hydroxyethylmethacrylate), poly(acrylic acid), poly(uracilacrylate), poly((meth)acrylamide-co-N-acetylacrylamide), poly(N-acryloylasparagineamide, poly(N-acryloylglutamineamide, and poly(N-methacryloylasparagineamide).

4. The cooling system as defined in claim 1 wherein the inner polymer has the LCST and is selected from the group consisting of poly(N-isopropylacrylamide), poly(N,N-diethylacrylamide), poly(N-vinlycaprolactam), poly[2-(dimethylamino)ethyl methacrylate], poly(ethylene glycol), and poly(ethylene oxide).

5. The cooling system as defined in claim 1 wherein the cooling plate includes a top sheet of a thermally conductive material and a bottom sheet of a thermally conductive material or a non-thermally conductive material, and wherein the top and bottom sheets are adhered together.

6. A thermal management system, comprising:
a plurality of battery cells; and
a thermal isolation mechanism positioned between adjacent battery cells, the thermal isolation mechanism including:
a thermally conductive material housing;
a solvent contained within the housing; and
a polymer having an upper critical solution temperature (UCST) or a lower critical solution temperature (LCST) contained within the housing, wherein:
the polymer having the UCST and the solvent are configured to form a single gel phase at a temperature above the UCST and the polymer having the UCST and the solvent are configured to form separate phases at a temperature below the UCST; or
the polymer having the LCST and the solvent are configured to form a single gel phase at a temperature below the LCST and the polymer having the LCST and the solvent are configured to form separate phases at a temperature above the LCST.

7. The thermal management system as defined in claim 6 wherein the solvent is selected from the group consisting of water and an organic solvent.

8. The thermal management system as defined in claim 6 wherein the inner polymer has the UCST and is selected from the group consisting of poly(sulfobetaine), poly(ethylene oxide), poly(vinyl methyl ether), hydrophobically modified poly(vinyl alcohol), poly(hydroxyethylmethacrylate), poly(acrylic acid), poly(uracilacrylate), poly((meth)acrylamide-co-N-acetylacrylamide), poly(N-acryloylasparagineamide, poly(N-acryloylglutamineamide, and poly(N-methacryloylasparagineamide).

9. The thermal management system as defined in claim 6 wherein the inner polymer has the LCST and is selected from the group consisting of poly(N-isopropylacrylamide), poly(N,N-diethylacrylamide), poly(N-vinlycaprolactam), poly[2-(dimethylamino)ethyl methacrylate], poly(ethylene glycol), and poly(ethylene oxide).

10. The thermal management system as defined in claim 6 wherein the thermally conductive material housing is selected from the group consisting of carbon nanotubes, copper, graphite, gold, nickel, silver, and titanium.

11. A battery pack, comprising:
a cooling plate having a coolant fluid channel defined therein, wherein the coolant fluid channel includes:
an outer polymer layer; and
an inner polymer having an upper critical solution temperature (UCST) or a lower critical solution temperature (LCST), and wherein:
the inner polymer having the UCST and a first solvent in the coolant fluid channel are configured to form a single gel phase at a temperature above the UCST and the inner polymer having the UCST and the first solvent are configured to form separate phases at a temperature below the UCST; or
the inner polymer having the LCST and a first solvent in the coolant fluid are configured to form a single gel phase at a temperature below the LCST and the inner polymer having the LCST and the first solvent are configured to form separate phases at a temperature above the LCST;
an interface pad positioned in contact with one surface of the cooling plate;
an isolation pad positioned in contact with an opposed surface of the cooling plate;
wherein each of the interface pad and the isolation pad is formed of a superabsorbent polymer;
a plurality of battery cells positioned in contact with the interface pad; and
a thermal isolation mechanism positioned between adjacent battery cells, each thermal isolation mechanism including:
a thermally conductive material housing;
a second solvent contained within the housing; and
a polymer having an upper critical solution temperature (UCST) or a lower critical solution temperature (LCST) contained within the housing, wherein:
the polymer having the UCST and the second solvent are configured to form a single gel phase at a temperature above the UCST and the polymer having the UCST and the second solvent are configured to form separate phases at a temperature below the UCST; or
the polymer having the LCST and the second solvent are configured to form a single gel phase at a temperature below the LCST and the polymer having the LCST and the second solvent are configured to form separate phases at a temperature above the LCST.

12. The battery pack as defined in claim 11, further comprising a tray to accommodate the insulation pad.

13. The battery pack as defined in claim 11 wherein the first solvent is water or a combination of water and a coolant, and wherein the second solvent is selected from the group consisting of water and an organic solvent.

14. The battery pack as defined in claim 11 wherein the inner polymer has the UCST and the polymer has the UCST, and wherein the inner polymer having the UCST and the polymer having the UCST are individually selected from the group consisting of poly(sulfobetaine), poly(ethylene oxide), poly(vinyl methyl ether), hydrophobically modified poly(vinyl alcohol), poly(hydroxyethylmethacrylate), poly(acrylic acid), poly(uracilacrylate), poly((meth)acrylamide-co-N-acetylacrylamide), poly(N-acryloylasparagineamide, poly(N-acryloylglutamineamide, and poly(N-methacryloylasparagineamide).

15. The battery pack as defined in claim 11 wherein the inner polymer has the LCST and the polymer has the LCST, and wherein the inner polymer having the LCST and the polymer having the LCST are individually selected from the group consisting of poly(N-isopropylacrylamide), poly(N,N-diethylacrylamide), poly(N-vinlycaprolactam), poly[2-(dimethylamino)ethyl methacrylate], and poly(ethylene glycol), poly(ethylene oxide).

16. The battery pack as defined in claim 11 wherein the superabsorbent polymer is selected from the group consisting of sodium polyacrylate, polyacrylamide copolymer, ethylene maleic anhydride copolymer, cross-linked carboxymethylcellulose, polyvinyl alcohol copolymers, cross-linked polyethylene oxide, and a starch grafted copolymer of polyacrylonitrile.

17. The cooling system as defined in claim 1, wherein:
the inner polymer has the LCST;
the solvent is configured to circulate through the coolant fluid channel when the temperature is above the LCST; and
circulation is configured to stop when the temperature is below the LCST.

18. The cooling system as defined in claim 17, wherein the LCST is 30° C.

19. The cooling system as defined in claim 1, wherein the outer polymer is selected from the group consisting of polyethylene and polystyrene.

* * * * *